G. L. BUTLER.
Seed-Planter.
No. 202,147.　　　Patented April 9, 1878.
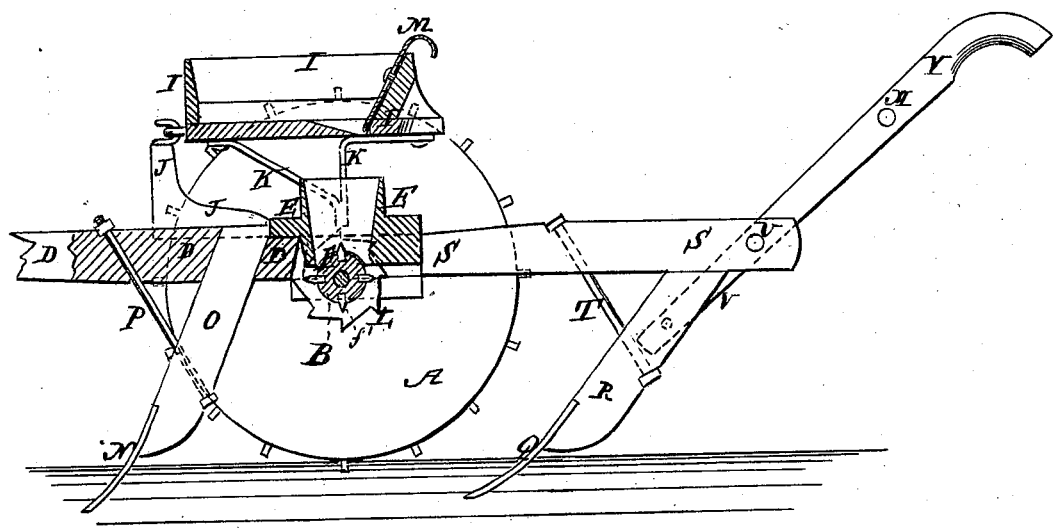
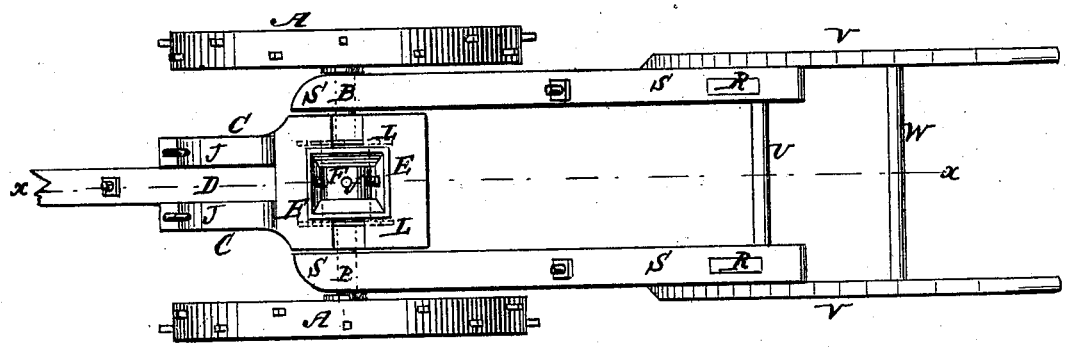
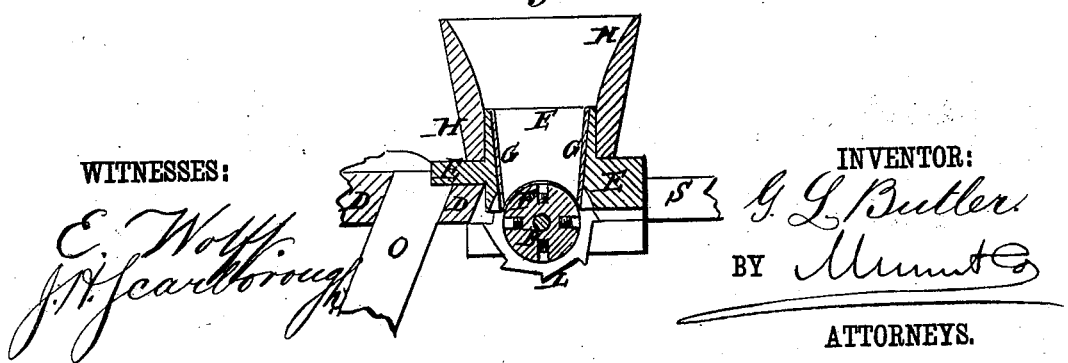
WITNESSES:　　　　　　　　　　　　　　　INVENTOR:

UNITED STATES PATENT OFFICE.

GEORGE L. BUTLER, OF MERRITTSVILLE, SOUTH CAROLINA.

IMPROVEMENT IN SEED-PLANTERS.

Specification forming part of Letters Patent No. 202,147, dated April 9, 1878; application filed June 25, 1877.

*To all whom it may concern:*

Be it known that I, GEORGE LUCIEN BUTLER, of Merrittsville, in the county of Greenville and State of South Carolina, have invented a new and useful Improvement in Seed-Planters, of which the following is a specification:

Figure 1 is a vertical longitudinal section of my improved machine, taken through the line $x\ x$, Fig. 2, and showing the fertilizer-hopper in place. Fig. 2 is a top view of the same, the hopper being detached. Fig. 3 is a detail section, showing the arrangement for planting cotton.

Similar letters of reference indicate corresponding parts.

The objection of this invention is to furnish an improved machine for planting corn, cotton, and pease, and distributing fertilizers, which shall be so constructed as to open a furrow, drop the seed or fertilizer, and cover it, and which shall be simple in construction and convenient in use.

The invention will first be described in connection with the drawing, and then pointed out in the claims.

A are the wheels, the rims of which are spiked or toothed to prevent them from slipping upon the ground. The wheels A are attached to the axle B, so as to carry the said axle with them in their revolution. The axle B revolves in bearings in the hounds C, to which the tongue D is attached, and the small box or hopper E. To the axle B, between the hounds C, is attached a small cylinder, F, in which are formed a number of holes, into which, when the machine is used for planting cotton-seed or distributing a fertilizer, are screwed spikes $f'$, to draw the said cotton-seed or fertilizer from the box or hopper E.

When the machine is used for planting corn and pease, the spikes $f'$ are removed, and any desired number of the holes are closed with screw-plugs, and the others are adjusted to hold the desired number of kernels by placing leather disks in the said holes. In this case the cavities in the front and rear lower edges of the box or hopper E are closed by small cut-off plates G, fitted against the inner surface of the front and rear sides of the box or hopper E, as shown in Fig. 3.

For planting cotton-seed, corn, and pease, the hopper H is used, which fits upon the hopper or box E, as shown in Fig. 3. For distributing fertilizers, the hopper H is detached, and the long hopper I is used, which has eyes attached to its forward end, to receive hooks attached to the upper ends of the brackets J attached to the hounds C.

To the side parts of the bottom of the hopper I are attached arms or brackets K, which pass down upon the opposite sides of the box or hopper E, and rest upon ratchet-wheels L attached to the axle B at the opposite ends of the cylinder F, so as to jar the hopper I and cause the fertilizer to pass down into the hopper or box E. The fertilizer escapes from the hopper I through a hole in the rear part of its bottom, the size of which is regulated by a plate, M, sliding upon the inclined rear end of said hopper, as shown in Fig. 1.

The furrow is opened to receive the seed and fertilizer by the plow N, attached to the lower end of the standard O, the upper end of which is attached to the rear part of the tongue D, and the draft-strain upon it is sustained by the brace P.

The seed or fertilizer is covered by the plows Q, attached to the lower ends of the standards R, the upper ends of which are attached to the rear parts of the beams S, and the draft-strain upon them is sustained by the braces T.

For some purposes the covering-plows Q may be replaced by a covering-board, secured to the plow-seats of the said standards R, and having its lower edge concaved to properly round off the ridge.

The rear ends of the beams S are connected by a round, U, and to the lower side of their forward ends are attached bearings to receive and ride upon the axle B.

V are the handles, the lower parts of which are attached to the standards R and the beams S, and their upper parts are connected by a round, W.

By this construction the machine, being jointed at the axle B, can pass over uneven places upon the ground without having the operation of any of its parts interfered with.

By this construction, also, briers, stalks, &c., that may catch upon the forward standard O, will have their longer ends caught by one or the other of the wheels A, and drawn from said standard, and any briers, stalks, &c., that may catch upon the rear standards R can be discharged by raising the rear ends of the handles V.

I am aware of the existence of fertilizer-distributers having shaking or vibrating distributing shoes or hoppers, and have also knowledge of planters which can be used for planting either corn or cotton.

I disclaim all broadness of invention, and confine myself to the particular construction and arrangement of parts comprising my fertilizer-distributer and corn and cotton planter, heretofore fully described.

Having thus described my invention, I claim as new and desire to secure by Letters Patent—

1. In a seed-planter, the combination of a frame for the seeding mechanism, that is provided with the wheels A, with the two beams S, having their front ends pivoted upon the axle B, and their rear ends provided with the handles V, whereby the beams S may be raised upward without affecting the other part of the machine, substantially as shown.

2. In a seeder, the combination of ratchets L, a suitable supporting-frame, a box, E, having its upper edge formed to receive the hopper H, whereby a rigid or a vibrating hopper may be used, substantially as shown.

3. The combination of the toothed dropping-cylinder F, ratchets L, box E, supports K, shoe I, and standards J, to pivot the end of the shoe to, substantially as described.

GEORGE LUCIEN BUTLER.

Witnesses:
 JNO. H. GOODWIN,
 J. B. DAVIS.